US008655059B2

(12) United States Patent
Malik et al.

(10) Patent No.: US 8,655,059 B2
(45) Date of Patent: Feb. 18, 2014

(54) METHOD FOR IMAGE CLASSIFICATION FOR COPY PATH BILLING

(75) Inventors: Amal Z. Malik, Pittsford, NY (US); Clara Cuciurean-Zapan, Fairport, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 100 days.

(21) Appl. No.: 13/229,354

(22) Filed: Sep. 9, 2011

(65) Prior Publication Data

US 2013/0066756 A1 Mar. 14, 2013

(51) Int. Cl.
*G06K 9/00* (2006.01)

(52) U.S. Cl.
USPC ............................ 382/162; 382/100; 382/165

(58) Field of Classification Search
USPC .................................. 382/100, 162, 165, 168
See application file for complete search history.

(56) References Cited

U.S. PATENT DOCUMENTS 5,786,906 A * 7/1998 Shishizuka .................. 358/500
7,903,285 B2 3/2011 Malik et al.
7,907,305 B2 3/2011 Malik et al.
2009/0195799 A1* 8/2009 Malik et al. .................... 358/1.9
2009/0195800 A1 8/2009 Malik et al.
2009/0195801 A1* 8/2009 Malik et al. .................... 358/1.9
2009/0226082 A1 9/2009 Li
2010/0005038 A1* 1/2010 Nagarajan et al. ............ 705/400
2010/0088201 A1 4/2010 Nagarajan et al.
2010/0100505 A1 4/2010 Campbell et al.
2010/0280929 A1 11/2010 Coffey et al.
2012/0143736 A1* 6/2012 Li .................................. 705/34

* cited by examiner

*Primary Examiner* — Li Liu
(74) *Attorney, Agent, or Firm* — Pillsbury Winthrop Shaw Pittman, LLP

(57) ABSTRACT

Disclosed is a processor-implemented method for processing image data representing a document using an image processing apparatus. The processor receives image data, determines the classifications and counts of pixels in the image data (e.g., in device independent space that are degrees of neutral or non-neutral), classifies the image data into a category based on the determination of classifications and counts of pixels, and determines a billing structure for the image data based on the classification of image data. The classification can be performed on the image data prior to conversion into device dependent space. For example, by counting true color, neutral, non-neutral, and fuzzy color pixels and comparing them to thresholds, the image data can be classified as neutral or very colorful. By classifying images earlier in the image path, errors in billing are reduced.

24 Claims, 5 Drawing Sheets

CONTROL OF PIXEL COUNTERS WITH NEUTRAL PIXEL DETECTION

NEUTRAL PAGE COUNTERS BASED IMAGE CLASSIFICATION FOR CONTONE COPY BILLING

NEUTRAL PAGE COUNTERS BASED IMAGE CLASSIFICATION FOR CONTONE COPY BILLING

METHOD FOR IMAGE CLASSIFICATION FOR COPY PATH BILLING

FIELD

This application generally relates to digital image processing, and in particular, to a system and method for classification of documents implemented through processes utilizing color pixels of image data and determining a billing structure for outputting documents based on this classification of the document.

BACKGROUND

Image data comprises a number of pixels having a number of components that contribute to defining the image, such as color and/or intensity. The image data generally includes various color or gray levels, which contribute to the color and/or intensity of each pixel in the image. Each pixel of the image is assigned a number or a set of numbers representing the amount of light or gray level for that color space at that particular spot, for example, the shade of gray in the pixel. Binary image data has two possible values for each pixel, black (or a specific color) (represented by the number "1") or white (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black.

The pixels may also be defined in terms of device independent space (e.g., when inputting image data, such as standard RGB (sRGB) or CIE L*a*b) or a device dependent space (e.g., when outputting image data, such as RGB or CMYK). When outputting image data to an output device (e.g., copier, printer, or multi-function device (MFD)), a percentage scale may be used to identify how much ink is employed for a print or copy job. Such information may typically be used for billing a customer for print or copy jobs. For example, some methods employ a billing strategy based on an estimated amount of ink or toner consumption; others bill customers based on a print mode selection (e.g., draft, standard, color, enhanced, etc.) of the output device. In dynamic print-job environments, because printing documents using black ink or toner is less expensive than using colored ink or toner, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. patent application Ser. No. 12/252,391 (published as Patent Application No. 2010/0100505 A1), filed Oct. 16, 2008 by the same Assignee (Xerox Corporation), which is hereby incorporated by reference in its entirety, proposes a way to count color pixels. In solid ink and ink jet products, however, it is desirable to render neutral gray objects with CMYK ink (e.g., create objects that appear gray to the human eye by using a particular combination of C, M, Y, and K, thus enabling higher image quality)). This could substantially decrease the appearance of graininess in large uniform gray areas, such as a gray fill or sweep. For billing purposes, it is not desirable to charge customer for color pixels that were (are) supposed to be gray. The above-referenced '505 publication, for example, has limitations in handling images that are converted to contone from rendered binary data.

In a typical multi-tier billing system for production printers, images are placed into different tiers based on the amount of color content on each page. Placing the image in the correct tier level is important both from the customer's, as well as the company's, perspective. Solid ink jet printer machines render neutral areas of an image with a combination of cyan, magenta, yellow, black (CMYK) toner/ink when printing or copying. This, however, creates problems in billing since these "gray" counts may be composed of color toners that mimic gray but are counted towards color.

This is because most existing billing systems are based on counting the number of color pixels in the C, M, Y planes, either simultaneously or separately, using a fixed offset to compensate for the composite black or gray areas. This (the fixed offset) sometimes causes the image to fall into a wrong tier level. For instance, a given pixel may be counted as a color pixel when the presence of any one of the C, M, and Y signals is detected—although it may actually be neutral gray. This increases the possibility of a page with composite black or gray to be classified as color, which is undesirable, because the color content results used to determine a billing strategy for a document may be skewed That is, the color classification may cause selection of a higher cost color billing strategy or a higher billing tier (selected from a multi-tier billing structure). Therefore, the customer may be billed for printing the document at a higher rate even though the output document reflects color pixels that are neutralized or gray. Vice versa, the page or document could be classified as neutral when it contains color. The billing strategy for a document in such a case could also be incorrect, and can result in the user being billed a lesser amount because of a selected lower billing tier. For example, a user or customer might not be billed even though the document contains a billable amount of very colorful pixels.

Other strategies have also been introduced to improve billing of documents. For example, U.S. patent application Ser. No. 12/962,298, filed Dec. 7, 2010 by the same Assignee (Xerox Corporation, which is incorporated herein by reference in its entirety), proposes a hybrid method of counting color pixels by making use of existing hardware in the image path. In one embodiment, the normalized minimum of the two counts, one count from the CIE L*a*b neutral page based counting and the other from the CMYK based counting, is used to derive the billing tier. Another embodiment is to simply use the number of color pixels detected in the CIE L*a*b space to determine the billing tier. The '298 application also proposes a method to perform area coverage based color pixel counting for the copy path. It uses the neutral pixel detection information obtained in CIE L*a*b space to control the counting of color pixels in rendered binary CMYK space.

While methods such that those above can be effective in dealing with composite gray pixels that are generated in the marking stage in solid inkjet systems, they may be limited in handling composite gray originals in the scanning process (e.g., due to the relative small context used in neutral pixel detection).

Accordingly, an improved system and method of determining the color content in a document to more accurately bill customers is desirable.

SUMMARY

One aspect of the disclosure provides a processor-implemented method for processing image data using an image processing apparatus. The image processing apparatus has at least one processor for processing documents containing image data having a plurality of pixels. The method includes the following acts implemented by the at least one processor: receiving image data of a document comprising a plurality of pixels; determining pixel classifications and counts of the pixels in the image data; classifying the image data into a category based on the determination of the pixel classifications and the counts, and determining a billing structure for the image data based on the classification of image data.

Another aspect of the disclosure provides a system for processing image data having a plurality of pixels. The system has an input device for receiving a document containing image data, at least one processing element, and an output device for outputting a document. The at least one processing element processes the pixels of the image data in a device independent space, and each processing element comprising an input and an output. The at least one processing element is configured to: receive image data of the document comprising a plurality of pixels, determine pixel classifications and counts of the pixels in the image data, classify the image data into a category based on the determination of the pixel classifications and counts, and determine a billing structure for the image data based on the classification of image data.

Yet another aspect of the disclosure provides a non-transitory computer readable medium having stored computer executable instructions, wherein the computer executable instructions, when executed by a computer, direct a computer to perform a method for processing image data, the method includes: receiving image data of a document comprising a plurality of pixels; determining pixel classifications and counts of the pixels in the image data; classifying the image data into a category based on the determination of the pixel classifications and counts, and determining a billing structure for the image data based on the classification of image data.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
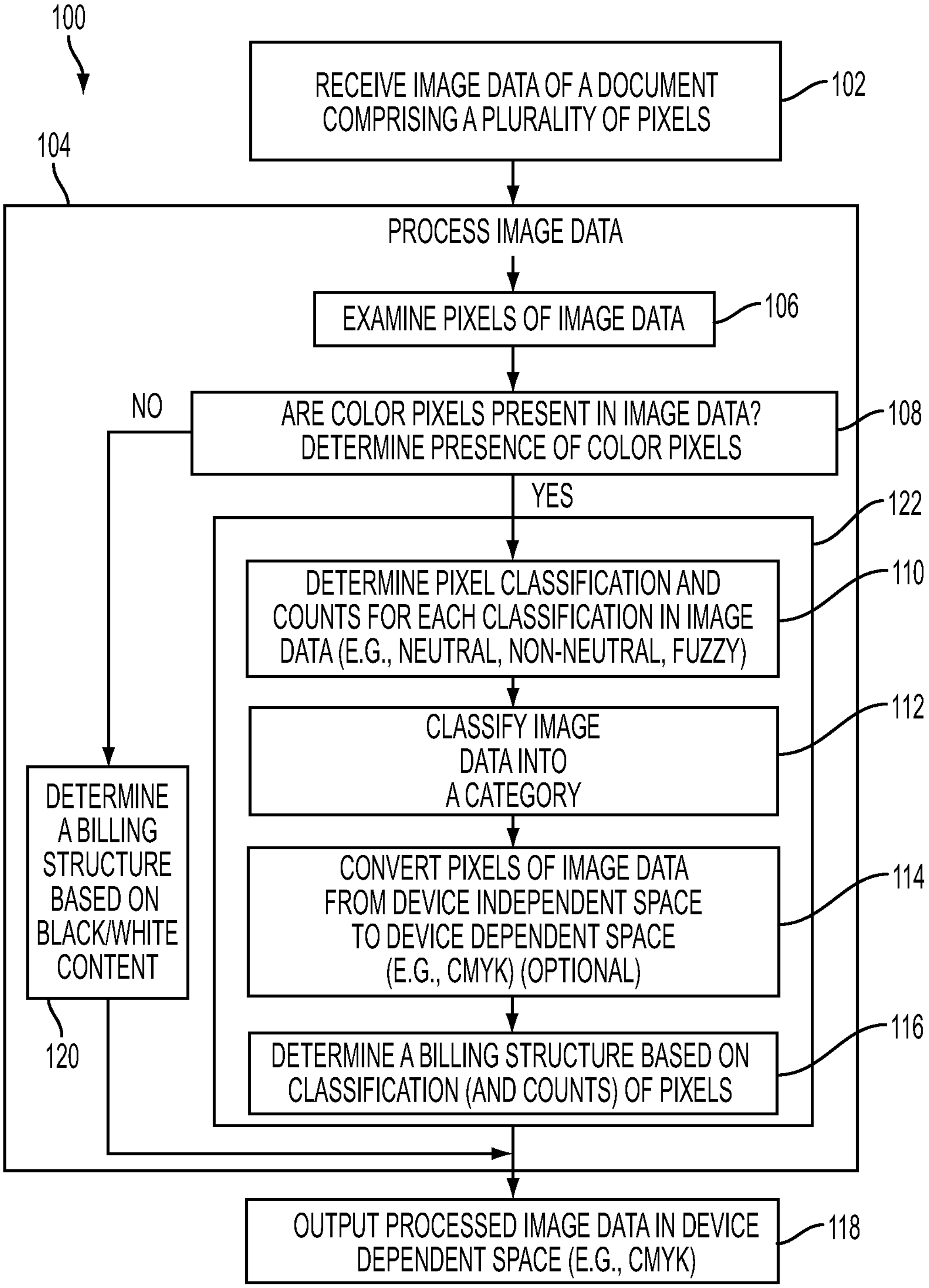
FIG. 1 illustrates a flow chart/block diagram illustrating a method for processing image data and determining a billing structure using a determination and classification method for the image data of a document in accordance with an embodiment of the present disclosure.

According to one or more embodiments, a methodology is disclosed that divides electronic images into different categories or classes based on the independent device color space of the pixels thereof. Color categorization counters may be used to count and classify pixels of the electronic image. Classification of images may be based on the amount and kind of color in a document. This kind of classification aids in tier level evaluation of these images that occurs later in the image path in a device dependent color space while being printed or copied. Such a classification earlier in the image path provides greater flexibility to a billing method. It provides for varying the parameters in the billing structure according to the image class (or category) of a document, making the billing method for the document more image specific and accurate. It can also help in selecting or choosing an appropriate image based tier level evaluation method, as well as increasing the adoption of color usage in the marketplace.

This disclosure uses algorithms, methods, and processing elements (e.g., hardware and/or software) in multi-function systems/devices to determine a billing structure taking the above into consideration.

Throughout this disclosure, neutral and non-neutral (i.e., color) pixels and a degree to which they are neutral and non-neutral are used as elements for determining billing structures (and/or estimating billing costs). The term "pixel" as used herein is defined as a pictorial element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. An image generally comprises a plurality of pixels having a number of components that contribute to defining the image when it is either printed or displayed.

As used herein, "device dependent" color space (or image data) means color schemes which are tied to or related to color production by a machine, such as printer, scanner or monitor. Many printing or copying machines, use additive or subtractive techniques to produce color. Typical device dependent color spaces, for example, include red-green-blue (RGB) or cyan-magenta-yellow-black (CMYK) color spaces. The color gamut is produced by a machine using different combination of these colors.

On the other hand, "device independent" color space (or image data), as used herein, means color schemes which are not tied to color production of a machine. Typical device independent color spaces include, for instance, CIE XYZ or CIE L*a*b* color spaces. No device is needed to produce these colors. Rather, the color space is related to human observation of color.

The term "non-neutral" or "color" pixel as used herein is defined as a pixel that comprises at least one color from a color set (e.g., when output via copy or print). For example, a color pixel may comprise one or more colors such as cyan ("C"), magenta ("M"), and/or yellow ("Y"). The term "neutral pixel" as used herein is defined as a pixel that is noticeably black (e.g., when output), noticeably white (i.e., no color), or rendered gray during processing, such when using as black ("K") colorant or a combination of colors and/or black to form composite black (formed from a combination of "CMYK"). A neutral pixel is a pixel that conveys black and white or gray information. With regard to some billing schemes, a neutral pixel is a pixel with one or more of its components (e.g. C, M, Y, K) on and that, when combined with other (neighboring) pixels, gives the appearance of black or gray. For example, pixels, when output on a document, may be rendered gray using black/composite black ink or toner. Neutral pixels have a chroma value that is about and/or close to 0. Chroma is the colorfulness relative to the brightness of another color that appears white under similar viewing conditions A "color" pixel as used herein is defined as a pixel that is typically noticeable to the human eye as having color, e.g., when output (copied or printed) on paper. Color pixels have chroma values in excess of zero (0) (either positively or negatively). Indeed, chroma values in excess of ±31 are typically noticeable by humans as colorful. For instance, chroma values within ±31 are typically not noticeable by humans as being very colorful.

In some embodiments, thresholds may be used to determine if a pixel is identified as a neutral pixel or a non-neutral/color pixel.

A "degree of neutrality" (or "degree of color") refers to a classification of a pixel with regards to its color (or lack of color). For example, as further disclosed below, a degree to which each pixel is neutral or non-neutral is determined and classified in one of a number of classes (or categories). Such classes may include, but are not limited to: fuzzy neutral, fuzzy color, true color, and/or other classifications that represent a degree of color. A count, amount, or total number of pixels in the image data for each class is determined. In some cases, the count of each class of pixels in the image data can be compared to a total number of pixels in the image data (or document or page). In accordance with this disclosure, the determined classifications and counts of the pixels (for each identified class) is used to classify the entire image itself. In some instances throughout this disclosure, the classification or degree of neutrality is referred to as a "kind" of pixel.

Generally, in known output systems/devices (e.g., printers, copiers, MFDs), when a document is to be printed or copied, the document is input into a device and the image data is processed in an image path. For example, with reference to FIG. 1, image data comprising a plurality of pixels is received at step 102 and processed at step 104. In some instances, if the image data is not already in independent color space then a step of converting the image data to a device independent color space may be optionally performed. In other instances, dependent image data may be processed.

Early in the image path when the image data is first processed, a determination may be made to determine if the input image data comprises black and white (or gray) pixels of image data, i.e., no significant color image data in one or more color planes, or color pixels. FIG. 1 shows how the pixels of image data may be examined at step 106. Then, in these systems/devices, the image is determined to be either a black & white or a color image (e.g., based on a pixel count) as shown at step 108. Afterwards, a billing structure/strategy for outputting the document is employed. In some known systems, the pixel count is typically an essentially pure count of color pixels, e.g., determining an amount of pixels for each output color component, whether or not composite black ink or toner is added during marking. For example, a binary CMYK domain is common in solid ink and/or other printing devices.

This disclosure, however, proposes an improved way of classifying image data (by counting different kinds or types of color pixels), so that pixels that may appear visibly neutral to the human eye are not counted as color when determining a billing structure for a customer or a user. Using existing hardware and/or software in the image/copy path, the following disclosure details how neutral and non-neutral/color detection results in device independent space (and possibly in conjunction with color pixel counting in device dependent space) are used to derive a billing structure/strategy for the image data (of a page or a document) being processed. Although there are exemplary embodiments described herein, it is to be understood that such embodiments are not meant to be limiting, and that other methods or algorithms that use neutral pixel determination in combination with pixel counting for billing purposes are within the scope of this disclosure.

In order to reduce or prevent potential billing problems with regards to billing customers for color pixels that do not visually appear to the human eye to contain color, this disclosure provides a method 100 for processing image data and determining a billing structure for outputting documents based on a color classification of the image data in device independent space, as shown in FIG. 1. The method 100 is not restricted to device independent color space only, and can possibly be performed in conjunction with color pixel counting in device dependent space. Generally, a billing structure is a method by which a charge to a user or customer for printing or copying a document is calculated. A billing structure may be a calculation method associated with or correlated with tiers, thresholds, values, or algorithms, for example. Further details regarding tiered billing structures are discussed below and in the incorporated reference(s).

In the described example embodiments, the executed billing plans are designed to determine a count of neutral pixels in the device independent space to thus exclude a count of pixels that appear neutral or gray to the human eye (e.g., which are made up of composite black (i.e., contain C, M, Y, and K colorants or medium). For example, even though some color pixels may be output to form grayscale image data, according to this disclosure, the billing structure may be chosen based on black printing or copying modes. In some cases, a method for counting grayscale or composite black as black pixels, such as disclosed in U.S. application Ser. No. 12/246,956, filed Oct. 7, 2008 by the same assignee, hereby incorporated by reference in its entirety, may be employed for processing grayscale image data that is received and processed by the methods disclosed herein. The exemplary embodiments herein are described with reference to counting non-neutral or color (CMY) pixels and without including types of rendered neutral or gray pixels, but should not be limiting. The actual color of the pixel (or combination of colors, e.g., in a neighborhood or area) as determined in device independent space is used either directly or indirectly to determine the color pixel counts used for classification (and thus the selected billing structure).

Figure 5:
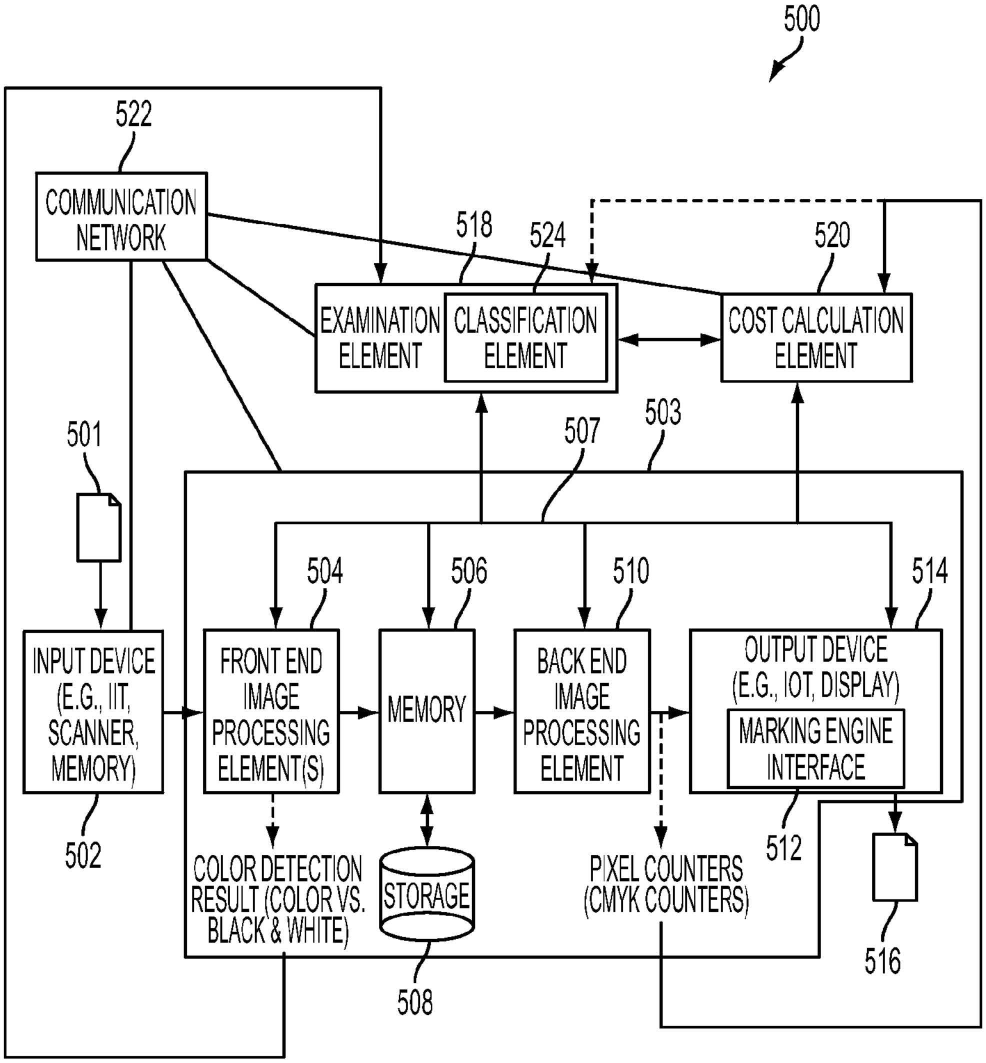
FIG. 5 illustrates an exemplary block diagram of an image path of a system, device, or image processing apparatus, in accordance with an embodiment, comprising at least one processor and an output device, for classifying and billing for documents using the method of FIG. 1.

Referring back to FIG. 1, illustrated is a flow chart/block diagram illustrating a method 100 for processing image data to determine a billing structure for outputting documents in accordance with an embodiment. Each of the method steps that are shown in FIG. 1 and throughout this disclosure may be implemented by one or more computers or processors, for example, and are not meant to be limiting. For example, the elements or modules as shown in FIG. 5 may implement the herein described method.

As previously noted, the method 100 begins at step 102 in which an output device/image processing apparatus/processor receives a document comprising at least one page of image data. The image data comprises a plurality of pixels. In some embodiments, the image data is received in device independent space. Alternatively, the image data may be in device dependent space. For example, the image data may be received in contone or RGB color space, or alternatively, comprise black and white pixels. Device dependent color space values, such as RGB and CMYK, may be converted to a device-independent color space, such as CIE L*a*b* color space, using transformation algorithms or a look-up-table (LUT), as known in the art; or, using ICC color management profiles associated with the printing system. The received image data in step 102 is representative of any type of page or document and may include a variety of objects to be detected and used by method 100; however, method 100 may use a document that includes any combination of objects (including text). For example, the document may include objects such as monochrome color text object(s) and/or color text object(s).

After receiving image data in 102, the image data is processed at 104. Such processing may include transforming the input image data into device independent color space, for example, if the image data is not already in device independent color. Techniques for converting image data from a device dependent color space to a device independent color space are well-known in the art and therefore not discussed in detail herein.

The pixels of the image data, in device independent color space, for each page of the document are then examined at -step 106. At 108, a determination is made to determine the presence of color pixels in the page. If no color pixels or content are detected, then, at step 120, a billing structure is implemented based on the detection that no color content is in the page (e.g., based on black/white content). The print/copy job would thus be billed at one rate which will be referred to from herein as "level 1 impressions". If, in step 108, color content is detected (e.g., detect the color pixels that are present in the image data of the document), then, at step 122 additional processing steps are applied. Specifically, a further examination of each pixel of image data is made to classify the image, which may be based on color pixels and/or neutral pixels. As shown the processing at 122 can include determining at step 110 pixel classification and counts of the pixels in the image data. For example, each of the pixels can be analyzed and/or processed to determine if the pixels in the image data are neutral or non-neutral (and/or any other pixel classifications levels) (i.e., color). That is, each pixel can be analyzed, either in device independent space (e.g., CIE L*a*b, YCbCr) or in device dependent space, to determine a degree of neutrality (a degree to which each pixel is neutral or non-neutral), and then classified in one of a number of classes (or categories). As noted above, such classes may include, but are not limited to: neutral, fuzzy neutral, fuzzy color, non-neutral, true color, and/or other classifications that represent a degree of color. A count or total number of pixels in the image data for each class is determined. In some cases, the count of each class of pixels in the image data can be compared to a total number of pixels in the image data (or document or page). In accordance with this disclosure, the determined classifications and counts of the pixels (for each identified class) is used to classify the entire image itself.

In one embodiment, a neutral pixel determination method as disclosed in U.S. Patent Application Publication No. 2009/0226082 A1 (U.S. application Ser. No. 12/042,370), filed Mar. 5, 2008, published Sep. 10, 2006, and assigned to the same assignee (Xerox Corporation), which is herein incorporated by reference in its entirety, is used for the determination and pixel classification at 110. However, the methods or steps for determining if a pixel is neutral (or not) or the degree to which it is neutral/color should not be limiting. Any number of neutral pixel or neutral page determination methods may be implemented with this disclosure that currently exist or that are developed in the future. Moreover, the type(s) and number of classes for classifying the pixels is not limited. In some instances, the type(s) and number of classes can be determined based on the type of machine or device being using for printing or copying. Accordingly, the classes described and illustrated herein are for explanatory purposes only, and it should be understood that alternative and/or additional classes may be used to classify the pixels of data.

Upon determining the pixel classification (degree of neutrality) and counts of each classification of the pixels in the image data, the image data (of the document or page) is then classified at 112. That is, the image data of the whole page or document itself is classified based on the pixel classification and counts determined at 110. This image classification is used to determine a billing structure, as further described below.

After the image data is analyzed at 110 and classified at 112, it may be further processed (as known in the art). It can be converted from device independent space to device dependent space, as shown at step 114, for example.

At step 116, a billing structure is then determined based on the classification of image data (classified at 112). For example, an image can be classified into a category based on a pixel count of at least the pixels determined to be color (and/or some degree of color, e.g., fuzzy color, true color) in the device independent space (the billable pixels being those of some degree of color). That is, the billable pixel count of color pixels may be determined based on a sum of each of the counts. In some embodiments, the classification of the image data may be determined based on pixel classification and counts determined in device independent space in conjunction with color pixel counting in device dependent space.

Optionally, after the billing structure is determined at step 116 or step 120, the processed image data may be marked and output at 118 using an marking/output device.

In the above method, the billing structure for outputting the page is based on at least the classification of image data. This classification can be made in device independent space (and possibly in conjunction with color pixel counting in device dependent space). The billing structures used with the image processing apparatus or output device should not be limiting. In an embodiment, it is envisioned that the billing structure(s) may be determined or based on a threshold value. For example, in an embodiment, the chosen or determined billing structure is based on the category in which the device independent image data has been classified, as compared to a threshold.

In an embodiment, the billing structure is based on a multi-tiered threshold value. The multi-tiered threshold value may be determined based on a number of categories for classifying the image data. That is, based on its classification, the page or document may be billed by choosing a billing structure associated with a tier (e.g., Tier 1, Tier 2, Tier 3) that satisfies the thresholds. One or more thresholds may be used to separate billing tiers which may be used to charge a customer. Such multi-tier billing plans provide options to the customer that better match types of printed documents and workflows. Additionally, two-tier and three-tier meter billing plans may replace black-only and color-only billing structures, which is more satisfactory for the customer and supplier.

According to one or more embodiments, a multiple tier billing methodology for color image printing is disclosed which reduces errors in billing for documents typically due to improper neutral pixel classification as seen in prior conventional billing methods. Pixels in the images are processed in a device independent color space. Images thus, are classified earlier in the image path, i.e., prior to conversion to a device dependent color space, according to the amount and/or kind of color for each image.

Different billing methods can then be selected and applied to each class or category later in the image path, e.g., after conversion to the device dependent color space. Because this approach is based on an image content dependent method, it produces more accurate billing results for the image data that is processed and marked for output. Using counters from multiple neutral pixel detection sources in conjunction with each other also provides improved accuracy for billing.

As an example, the 3-tier color distribution may include: neutral color, everyday color, and expressive color use. Documents determined to be of neutral color may include image data comprising no color (i.e., black and white image data) to a very small amount of color, where the amount of color is less than a threshold CMY_TH1. Documents of everyday color may include image data comprising color that is greater than threshold CMY_TH1 and less than a threshold CMY_TH2, wherein CMY_TH2 is a threshold greater than CMY_TH1. Documents of expressive color may include very colorful images, wherein a color amount of the document is greater than threshold CMY_TH2. As understood by one of ordinary skill in the art, the thresholds CMY_TH1 and CMY_TH2 may be predetermined or dynamic thresholds that are used for analysis of the image data. For example, in an embodiment, the thresholds CMY_TH1 and CMY_TH2 may comprise three (3) and ten (10) percent (%), respectively. Further discussion regarding such thresholds is provided in the incorporated '298 application, for example.

In accordance with an embodiment, the three tiers may be defined as follows: Tier 1: all black and white documents and documents with a small amount of color are billed at black and white rate (e.g., neutral, level 1 impressions); Tier 2: documents with more than a small amount of color but less than a large amount of color are billed at a lower than market color impressions rate (e.g., everyday color, level 2 impressions); Tier 3: documents with large amounts of color that are billed at a competitive market color impressions rate (e.g., expressive color, level 3 impressions). However, this is example is not meant to be limiting and could extend to N-tier level billing systems. To determine such tiers, break-points, percentages, or thresholds may be used. In the illustrated embodiment, the thresholds for dividing the tiers are based on the categories for classifying the image data. As further disclosed below, these categories may be defined by threshold(s) which are used for comparison with different kinds and amounts of color pixels. In an embodiment, the thresholds may be based on a percentage of color, e.g., a kind and amount of color pixel compared to a total amount of pixels in the image data. However, the counts or thresholds and methods of defining the counts or thresholds that are used to determine the categories and thus the tiers (e.g., ratio, percentage, pixel count) should not be limiting.

Figure 2:
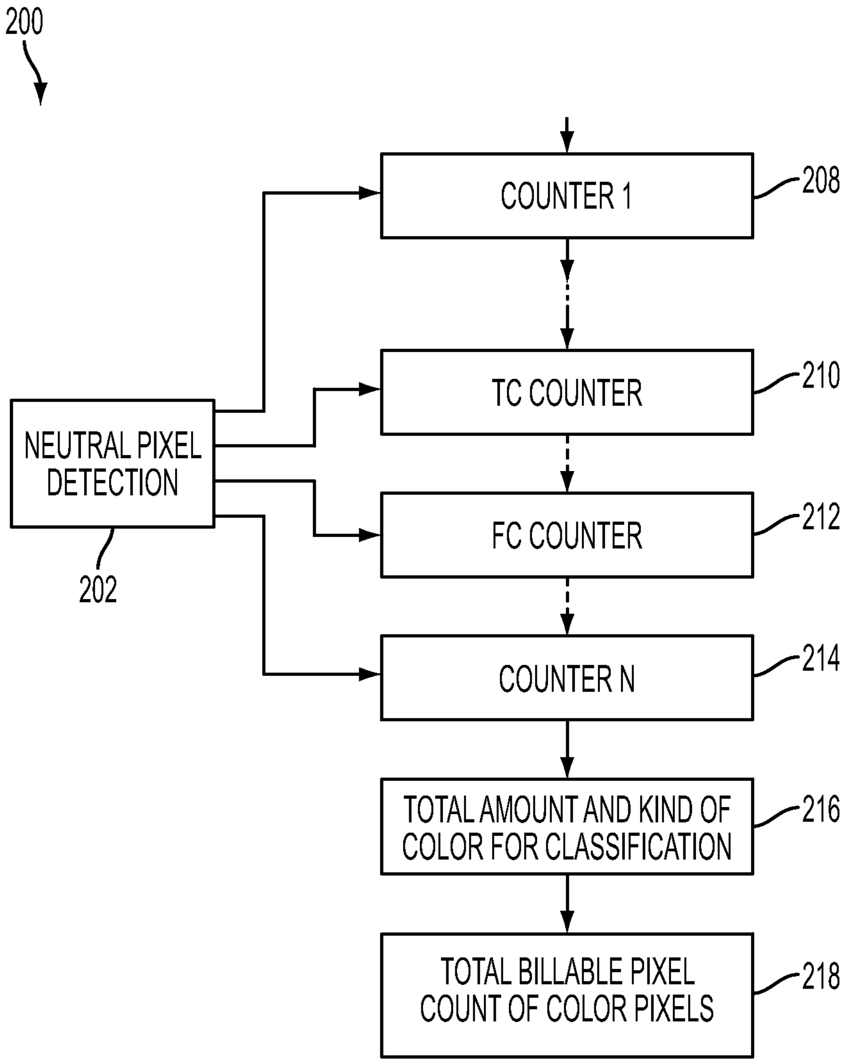
FIG. 2 illustrates exemplary control diagram of counters for pixel counting of pixels determined to be of selected pixel classifications.

FIG. 2 illustrates exemplary control diagram 200 of counters for pixel counting. In the illustrated embodiment, a contone domain neutral detection result (either device independent such as CIE L*a*b space or device dependent space such as CMYK) may be used to control the counting. A neutral pixel detection calculator 202 may be provided to determine if pixels are neutral or non-neutral. It can further be extended to determine other classes such as the fuzzy neutral, fuzzy color, true color, and true neutral pixels, or any other levels of pixel classification. In an embodiment, a neutral pixel or neutral page detection method is implemented on the image data in device independent space (such as CIE L*a*b color space). Generally, neutral page detection methods are used to determine the class and amount of color content that a page contains. For example, pixels may be analyzed using a reduced image and a window and neighboring pixels (of a pixel of interest) to determine if a pixel/page is detected as neutral or non-neutral. For example, in an embodiment, pixels may be compared against a set of thresholds, and a number of pixels exceeding the set of color thresholds may be determined. Those pixels that exceed the set of thresholds may be used for the color count and/or to determine if a page is neutral. In another embodiment, a ratio of the pixel counts (e.g., compared to a total number of pixels in the image data) (or percentage based on the total amount) can also or alternatively be used to compensate for the scaled image and to have a count comparable to the CMYK counters. In another embodiment, neutral page counters coming from a scaled image could be used in conjunction with the neutral pixel counters to ensure better accuracy. In an embodiment, the method(s) described in the above-mentioned incorporated '082 application may be used for neutral pixel detection at 202, for example.

As represented by neutral pixel detection box 202, after classification of each pixel into a class, each of the classes of pixels are counted using counters 208-214. The number of counters 208-214 may relate to the number of classification levels of pixels.

For example, any number 1–N+2 of counters Counter 1 208 through Counter N 214 may be provided. In an embodiment, at least a true color (TC) counter 210 and a fuzzy color (FC) counter 212 are provided, as shown in FIG. 2. Each counter may be incremented by one for each occurrence thereof, for example. As used herein, "true color" means a pixel having color which corresponds to actual or noticeable color by the human eye. In other words, the pixel color includes some chroma. "Fuzzy color" means a pixel having color which is not definitive of actual color or discernable by the human eye. These may correspond to rendered neutral pixel colors, composite black, as well as neither very neutral, nor very colorful pixel counts. For example, in an embodiment, fuzzy pixels may have a range between +–15 and +–25.

The TC counter 210 and FC counter 212 may be provided with or without any additional number of counters 208-214. In an embodiment, the counters 208-214 may be one or more image feature counters, such as, for example, a very colorful counter, color counter, highlight counters, fuzzy neutral counters, saturated color and non-saturated color counters, or they may be the C, M, Y, and K counters from device dependent space. Although two types of counters, one in contone domain in device dependent space and the other in binary domain in CMYK space may be used, in some embodiments, contone counting alone is used for billing calculation of the billable pixel count at 218. In some other embodiments, a combination of contone and binary counting is used.

In an embodiment, a 2-bit tag (true neutral pixel, fuzzy neutral pixel, true color pixel, fuzzy color pixel) is dumped out by neutral pixel detection module 202 to generate and/or control the counters 208-214.

Each count of the counters 208-214 may be used to determine the total amount and kind of color for classification, indicated at 216 (i.e., determine the pixel counts and classifications). For example, the determination at 216 of the amounts and kinds (counts and classes) of color pixels may be used for the method 300 shown in FIG. 3 to classify the image data into a category. In an embodiment, the counters 208-214 may also be used to determine the total billable pixel count of color pixels, as indicated by 218. For example, in an embodiment, the total billable pixel count of color pixels at 218 may be used in combination with the classification of image data to determine the billing structure. The counters 208-214 may vary and the information obtained from the counters may be used for other processes and/or methods.

In the illustrated embodiment of FIG. 2, each counter 208-214 may be a binary or a contone counter comprising a U32.0 or U29.0 format.

The description below discloses one exemplary embodiment that may be implemented by one or more modules in an apparatus for determining pixel counts that are used to classify the image data into categories. The determination is made based on the determinations in step 110 in method 100 in FIG. 1 during the processing in 122. The detection or determination may be performed by a controller or processor (e.g., front end image processing elements 504, as shown in FIG. 5) on a reduced image to save memory, for example. The determination of pixels for classification and counting, however, is not limited to the below-described embodiment.

In this embodiment, the count of pixel classes (e.g., neutral and non-neutral pixels) in the image data of a page (or document) may be determined at 110 based on determinations including image reduction, chroma calculation, luminance-based threshold adjustment, and a final count determination. Each determination may be performed (using modules or processing elements such as those shown in FIG. 5) as follows:

Image data is provided in device independent color space (having been received or converted thereto) for processing, such as, for example, CIE L*a*b color space, or any other luminance-chroma based color space image data (not necessarily device independent). Detection may be performed on pixel-by-pixel (for pixel p=1 to total_pixels) based, for example. Then pixels, or groups of pixels, are categorized as being true color or fuzzy color, and counted (e.g., using counters in FIG. 2) for each image/document.

In some instances, the image data may be optionally reduced so as to lower memory requirements during processing. For example, in one embodiment, the image data may be reduced by eight times (8×) in the fast scan direction and by four times (4×) in the slow scan direction.

For every discrete 8 pixel block in an input scan line, pixels are accumulated, divided by two to reduce memory requirements. For instance, halfSum may be limited to 10 bits, in some embodiments:

$$\text{halfSum}=(P_n+P_{n+1}+P_{n+2}+P_{n+3}+P_{n+4}+P_{n+5}+P_{n+6}+P_{n+7}+1)>>1, \text{ where } n=i*8; \text{ and } i \text{ is defined as the block number, i.e., block } 0, 1, 2 \ldots \text{ total\_pixels}/8$$

Then for each block i, the block sum over four scanlines is accumulated as follows:

$$\text{sumBuf}[i]=\text{sumBuf}[i]+\text{halfSum}$$

In hardware, sumBuf[i] is held reset for the first scanline and for every fifth line which follows.

After the block sum sumBuf[i], has been accumulated over 4 scanlines, the average video value for that block is calculated by rounding up and then dividing by 16 (since values had previously been divided by 2):

$$\text{avg}[i]=(\text{sumBuf}[i]+8)>>4$$

This average block value can be updated on every fourth scanline once every 8 pixels, i.e. once the sum of a block of 8 pixels by 4 lines has been accumulated.

For each block location, i, there will be three average values, one for each color plane, e.g., for CIE L*a*b color space: avg_L[i], avg_a[i], and avg_b[i].

Chroma Calculation

The chroma of each pixel may be calculated as follow on a pixel-by-pixel basis:

$$\text{chroma}[p]=\max(|\text{avg\_}a[p]-\text{offset}A|,|\text{avg\_}b[p]-\text{offset}B|)+[\min(|\text{avg\_}a[i]-\text{offset}A|,|\text{avg\_}b[i]-\text{offset}B|)]/2$$

Alternatively, the chroma of each pixel block in the reduced image may be calculated as follow on a pixel-by-pixel basis:

$$\text{chroma}[i]=\max(|\text{avg\_}a[i]-\text{offset}A|,|\text{avg\_}b[i]-\text{offset}B|)+[\min(|\text{avg\_}a[i]-\text{offset}A|,|\text{avg\_}b[i]-\text{offset}B|)]/2$$

where offsetA and offsetB are values ranging from 0 to 255. Typical values for offsetA and offsetB are 128, though they are not limited. These variables can be programmable, in some instances.

Luminance-Based Threshold Adjustment

The chroma values calculated for each pixel block are compared against a pair of thresholds parameters, c1 and c2. These threshold parameters c1 and c2 are scanner dependent, and may vary with scanner to scanner variation and the outputs as desired by the program. The value c1 is luminance dependent. In one implementation, the three most significant bits (MSB), i.e., left-most bits-of avg_L[i] values (in binary) are used as the index to a programmable threshold look up table (LUT). Table 1, below, includes exemplary LUT values for threshold parameter c1. Of course, the luminance-based threshold adjustments may also be performed on a pixel-by-pixel basis.

TABLE 1

| 3 MSBs of avg L[i] | c1 |
|---|---|
| 000 | 9 |
| 001 | 8 |
| 010 | 7 |
| 011 | 6 |
| 100 | 6 |
| 101 | 6 |
| 110 | 6 |
| 111 | 5 |

The threshold, c2, may be calculated as follows:

$$c2=c1+\text{delta}C \text{ where delta}C \text{ is a programmable value from 0 to 31.}$$

The range of c1 and c2 may be between 0 to 31, for example, in one or more embodiments. The chroma values calculated above are compared against the thresholds c1 and c2. Values greater than 31 may be likely to be noticeable to users (as they represent very colorful images). In an embodiment, typical values for c1 may include or be between about 5 and about 10, and typical values for c2 may include or be between about 10 and 50 (although, it will be appreciated that other values may also be used in other implementations).

Final Determination of True Color (TC) and Fuzzy Color (FC) Counters

The two counters, TC and FC counters 212 and 214, are used to record the number of pixel blocks that meet certain conditions. If the chroma value is between the two thresholds, c1 and c2, then the FC will be incremented by 1 (represented by ++below); if the chroma value is greater than the second threshold, c2, then the TC counter will be incremented by 1 (represented by ++below):

```
if (chroma[i] > c1 & chroma[i or p] <= c2)
      FC ++
else if (chroma[i] > c2)
      TC++
```

Of course, the TC and FC counters may also be executed on a pixel-by-pixel basis in any number of luminance-chroma based color spaces (e.g., L*a*b, YCbCr).

Once all pixels or blocks of pixels of the image data have been classified and counted, the image data for the document is classified based on the combined results from TC and FC counters, i.e., based on the total amount and kind of color for classification in 216 of FIG. 2.

Again, as noted above, it should be understood that more or alternate counters could be introduced to improve accuracy.

Figure 3:
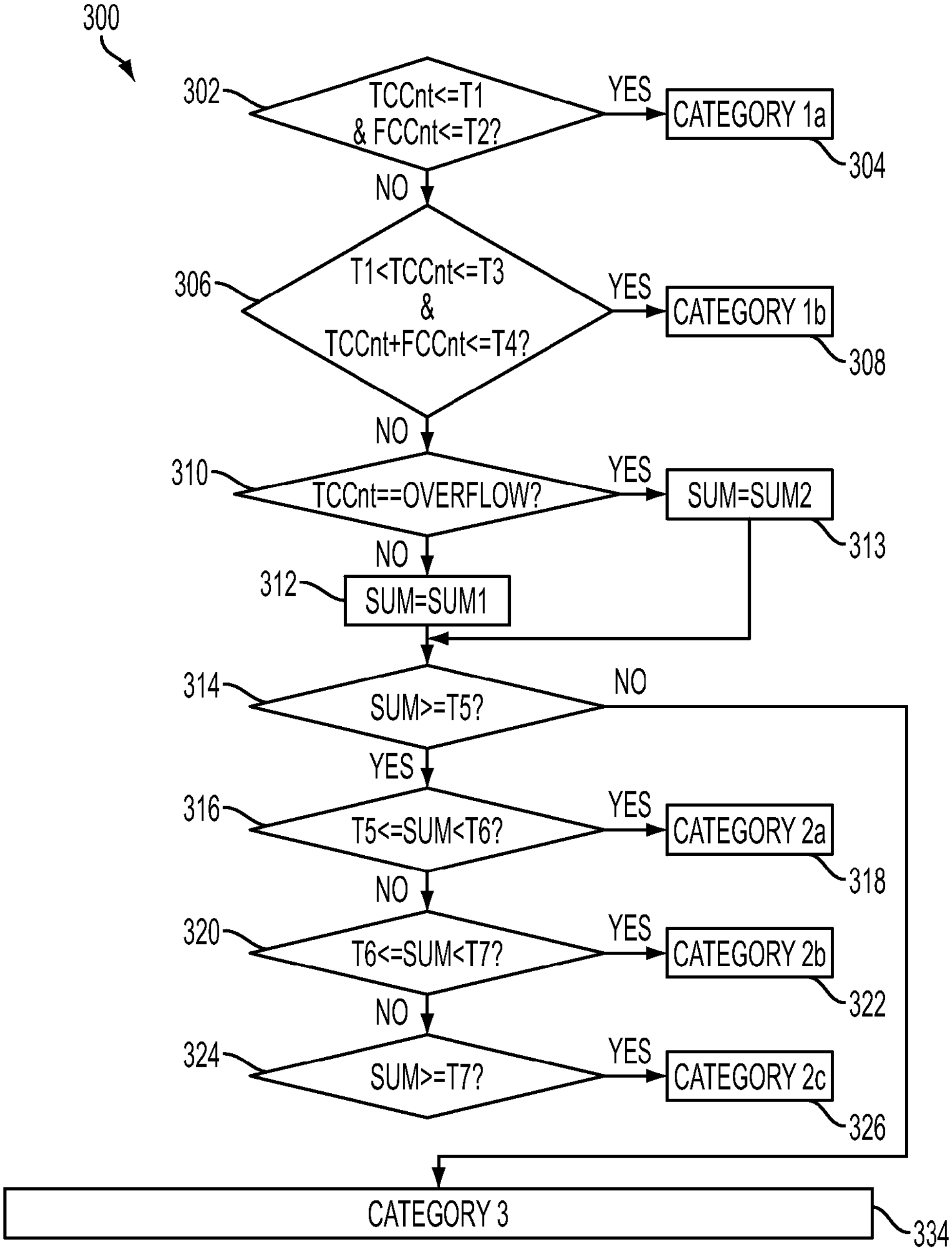
FIG. 3 illustrates a flow chart/block diagram illustrating a method for classifying image data of a document into a category using color pixels counts and thresholds in accordance with an embodiment of the present disclosure.

In an embodiment, images may be classified into three or more different categories or classes (e.g., Category 1, Category 2, and Category 3) and/or subclasses at step 112 in method 100. FIG. 3 illustrates a flow chart/block diagram illustrating a method 300 for classifying image data of a document into a category using color pixels counts, classifications, and thresholds. The classification performed by this flow chart is determined and implemented in step 112 of method 100, for example, and is later used to determine the billing strategy or structure in step 116. In implementations, the image may be classified as neutral, some color, or very colorful. The categories (1, 2, and 3) that are illustrated and used to classify the image data, which are used to determine a billing structure, are exemplary and for explanatory purposes only. As will become further evident, the categories, thresholds, etc. used to classify the image (and thus, to bill for the output of the image) can be extended and/or altered.

Figure 4:
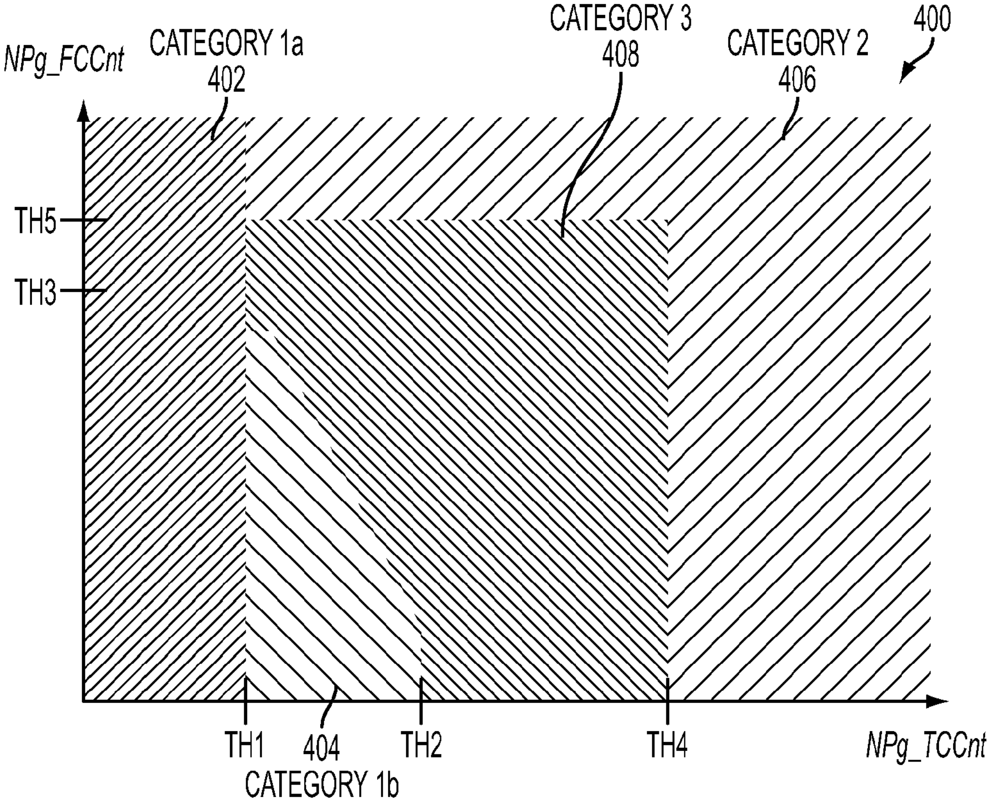
FIG. 4 illustrates a graphical representation of billing categories based on pixel classification and counting and comparison of these counts with thresholds used for determining a billing structure for a document.

FIG. 4 illustrates a graphical representation of billing categories based on pixel classification and counting and comparison of these counts with thresholds used for determining a billing structure for a document. Again, the tiers and/or classification can be extended and/or altered to apply this method to N-tier billing systems, in accordance with some embodiments, and therefore the illustration is not meant to be limited. Specifically, graph 400 shows neutral page fuzzy color count versus neutral page true color count with noted thresholds TH1, TH2, TH3, TH4, and TH5. The graph 400 also shows a possible split into categories of all the possible values of (true color count, fuzzy color count) pairs. Categories 1a and 1b (which may be subcategories of Category 1), 2 and 3 are generally located and considered for billing. The following is a general description for the types of images that are classified in the illustrated categories:

1. Category 1: Images for which True Color and sometimes Fuzzy Color counters are less than some pre-determined threshold are classified as neutral images. In FIG. 4, the regions 402 and 404 show this case. These images all fall in a tier 1 billing level, and this covers one of the most sensitive billing areas for copies of composite gray images.
2. Category 2: Very colorful images for which the sum of the True Color and Fuzzy color counters are greater than some pre-determined threshold as shown in region 406 of FIG. 4. This class may be further subdivided into 3 categories 2a, 2b, and 2c based on the sum of the two counters. A fraction of either the two counters or only the fuzzy color counter could also be added to evaluate this sum.
3. Category 3: Images that do not fall in any of the two above categories. Region 408 in FIG. 4 represents this case.

In accordance with an embodiment, the calculations that are used for classification of the image data, as illustrated in method 300 of FIG. 3, are defined as follows:

NPg_TCCnt=Neutral Page True color count (i.e., count from TC Counter 212);

NPg_FCCnt=Neutral Page Fuzzy color count (i.e., count from FC Counter 214);

Sum1=NPg_TCCnt+MF1*NPg_FCCnt; and

Sum2=NPg_TCCnt+MF2*NPg_FCCnt, where MF1 and MF2 are multiplication factors, and MF1≥MF2.

NPg_TCCnt and NPg_FCCnt could relate to the counts determined by the counters 208-214 from FIG. 2, for example.

In some instances, the values for multiplication factors MF1 and MF2 may be 0.75 and 0.8, respectively. These values may be selected to compensate for clipping of FC and TC counters in the hardware of the system, for example, or for larger sized images or documents. However, weighting factors are optional and need not be used.

After the neutral page true color count (NPg_TCCnt), neutral page fuzzy color count (NPg_FCCnt) and sums are calculated, they can be compared to a number of thresholds T1-T7 as shown in the method of FIG. 3. Such thresholds T1-T7 may be programmable parameters that are based on billing tiers, for example, or the desired levels of image classification. In some embodiments, these programmable parameters could be based on the variables CMY_TH1 and CMY_TH2 described above for CMYK color space. This may, for example, provide a more accurate mapping between classified images and final tier placement of the CMYK images, since the final output may be an unscaled image. Weighting factors as explained above can help in the correlation expression if the neutral page or neutral pixel algorithm is applied on a scaled image with scaled counters coming out of those modules, for example.

In accordance with an embodiment, the thresholds are defined as follows:

| Threshold | Value (Number of pixels; k = one thousand) |
|---|---|
| T1 | 1k |
| T2 | 40k |
| T3 | 5k |
| T4 | 10k |
| T5 | 60k |
| T6 | 70k |
| T7 | 80k |

In addition, in some embodiments, the image classes may be increased by increasing and varying the ranges of TC and FC counters to either increase the number of image classification levels or to improve accuracy, such as implementing [0,1k], [1k,5k], [5k,14k], [15k,50k], [greater than 50k] for each counter individually, or a sum of the TC and FC counters. This can improve accuracy, and/or cover more tier levels (e.g., more than 3), if desired or needed.

However, these threshold values and the numerical count of thresholds used for comparison and classification are exemplary, and thus should not be limiting. For example, in the embodiment of FIG. 3, because of the number of thresholds used (seven), there are a total of 6 categories formed from subcategories, i.e., category 1a, category 1b, category 2a, category 2b, category 2c, and category 3. However, more or less categories and/or subcategories may be defined based on the number of billing tiers and structures that are associated with a system, based on a customer's profile, and/or based on the output parameters of the system.

The method 300 of FIG. 3 may be implemented for each page of image data. The true color count TCCnt and the fuzzy color count FCCnt can be determined, where TCCnt and FCCnt can be the same as NPg_TCCnt and NPg_FCCnt, respectively, or they could be a combination of both—they can be the maximum of the two counters, or the minimum, or a fractional sum of the two. In another embodiment, as shown in FIG. 4, it could be only NPg_TCCnt being less than some very small threshold number TH1. In another embodiment, they can be amount(s) from one or more counters such as those described with respect to FIG. 2 (e.g., true color (TC) counter 210, fuzzy color (FC) counter 212).

Method 300 starts at 302 by comparing the true color count TCCnt to a first threshold T1 and the neutral page fuzzy color count FCCnt to a second threshold T2. If the counts TCCnt and FCCnt are both less than or equal to their respective thresholds, i.e., YES, then the image data is classified at 304 as Category 1a. If both are not less than or equal to the thresholds, i.e., NO, then the true color count TCCnt is compared to first and third thresholds T1 and T3 at 306. Additionally, the TCCnt and FCCnt are added together. If the CCnt is greater than T1 but less than or equal to T3, and if the sum of the TCCnt and FCCnt is less than T4, i.e., YES, then the image data is classified at Category 1b at 308.

If, however, one or both are not true, i.e., NO, then at 310 it is determined if the TCCnt is in overflow. "Overflow" refers to an amount that meets or exceeds a maximum number or count that a register (hardware) can hold. For example, if register size is U16.0 and the NPg_TCCnt is about 65535, the NPg_TCCnt is an overflow. If YES to 310, then at 313 the sum to be used for any remaining decisions is SUM2 (e.g., as calculated using the equation noted above). If NO, then at 312 it is determined that SUM1 will be used for any remaining decisions (e.g., as calculated using the equation noted above).

At 314, it is determined if the selected SUM (i.e., SUM1 or SUM2) is greater than or equal to a fifth threshold T5. If it is not, i.e., NO, then the image data is then classified as Category 3 image data at 334.

If the SUM is greater than or equal to T5, then it is compared at 316 to fifth and sixth thresholds T5 and T6. If the SUM is further less than T6, i.e., YES, the image data is classified as Category 2a image data at 318. If, however, the SUM is not less than T6 (and greater than or equal to T5), i.e., NO, the sum is further compared to a seventh threshold T7. If the SUM is greater than or equal to T6 and less than T7, i.e., YES, the image data is classified at 322 as Category 2b image data. If, however, the SUM is not less than T7, i.e., NO. then at 324 it is determined if the SUM is equal to or greater than T7. If YES, it is classified as Category 2c image data at 326.

Accordingly, the ranges in FIG. 3 illustrate an example of one implementation of thresholds being used to classify an image into one of a plurality of categories. Of course, it should be understood that other and/or additional ranges such as <60k, [60k, 70k], [70k, 80k], [80k, 90k], etc. may be implemented.

Thus, in an embodiment, when the billing structure is determined in step 116 of method 100 shown in FIG. 1, these categories (e.g., Category 1-Category 3) may correspond or correlate to different billing tiers. That is, if the image data of the document is classified into category 1, the billing structure is determined based on a first tier (e.g., black content/neutral, level 1 impressions); if the image data is classified into category 2, a second tier (and/or third tier) is used to determine the billing structure (e.g., everyday color, level 2 impressions, and/or expressive color, level 3 impressions), etc. In an embodiment, each of the categories and the subcategories, i.e., categories 1a, 1b, 2a, 2b, and 2c, may correlate to a billing tier.

In another embodiment, the image level classification can be combined with information from with CMYK counters to determine a billing tier level.

A different billing rate may be assigned to or associated with each of the billing tiers. The rates may also be based on a customer profile. These may be expressed, for instance, in cost ($) per page (or document). However, such values are not to be construed as limiting, and it will be appreciated that different users may adopt different billing schemes.

Although not shown in FIG. 3, classifying the image data into categories may also be based upon additional image feature counters, such as, for example, very colorful counter, color counter, highlight counters, fuzzy neutral counters, saturated color and non-saturated color counters. Moreover, the classification of images could use a combination of device independent color space (e.g., Lab/YCbCr) counters and the device dependent color space (e.g., CMYK) counters, such as, for example, to improve accuracy.

In an embodiment, additional image classification may be based upon neutral page algorithms. This classification prepares the images for better billing strategies by providing the flexibility to apply different offsets/compensation factors ((which could be image dependent or independent) and algorithms for the various image classes.

The above-described embodiments are exemplary and illustrate examples of using image data in device independent space to count or calculate a kind (or type) and amount of color pixels for output so that pixels that are rendered neutral (and not visibly color to the human eye when output) are not counted when determining a billing structure. In copy path images, for example, many pixels in a composite gray area may be typically labeled as color and skew billing detection results. However, the above-described methods improve the color detection for billing. From a customer point of view, the methods disclosed herein not only avoid the mistake of billing a neutral page or gray pixels as color, but also determine an accurate billing structure based on visibly output color.

Different billing processes and/or parameters may be selected and applied based on the image type. This may include a step-wise approach that uses an independent color space page detection scheme to evaluate or select a correct color-tier level for a billing system for color images. The independent color space page detection scheme is configured to properly identify and handle composite black and neutral colors. This process reduces the errors introduced by the conventional billing method discussed above.

The herein described method may be used by any MFD (or printer or copier) manufacturing companies that wish to implement image paths capable of rendering pixels neutral with composite black without counting these pixels as color in billing. As noted below, the method may be implemented by hardware and/or software in existing systems or added to systems for implementation.

FIG. 5 illustrates a block diagram of an example of an image path 500 for processing image data of a system, device or image processing apparatus 503, for classifying and billing for documents using the method of FIG. 1 according to an embodiment. The apparatus 503 comprises, among other devices, an input device (e.g., IIT or memory) 502, a processor or processing elements represented by 504 and 510, a memory 506 and/or a storage device 508, and an output device (e.g., image output terminal (IOT)) 514 with a marking engine interface 512. The image path 500 of the system 503 may also include an examination element 518 and/or cost calculation element 520 which may be a part of the system 503 itself or in communication with the processing elements 504 and 510, for example. Generally, the above elements (as will be described) of the device are provided to perform functions that assist in receiving image data such as a scanned document, configuring the image path of the processing elements 504 and 510 (and possibly elements 518 and 520) to process the image data, and, if needed, outputting the image data such as by printing a document according to an output mode that may be selected. However, it should be noted that the apparatus or device may comprise additional elements not described herein or alternative elements for performing similar functions, and should not be limited to those elements as illustrated in FIG. 5. Generally, the image path shown in FIG. 5 corresponds to any number of output modes that may be selected for an image processing apparatus, system, or device.

The input device 502 is used to deliver image data of a document to the system 503 and/or processing elements in the image path. In some embodiments, the input device 502 is used to scan or acquire an input document 501 or page into image data, such as when copying a document, for example. The input device 502 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 502 may include submission of electronic data by any means and should not be limiting. In other embodiments, the input device 502 may be an electronic device for inputting electronic image data. In some embodiments, input device 502 may be connected to a communication network 522 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 502 and/or processing elements in the apparatus 503. For example, in embodiments, the image data may be converted from device dependent space to device independent space (e.g., RGB to L*a*b). Alternatively, the image data may be received in device independent space (e.g., L*a*b or PostScript). The type of image data received and the type of input devices documents are received therefrom should not be limiting.

In any case, image data, such as image data for an original document 501, may be received or input in either device dependent or device independent space from the input device 502, depending on the capability of the input device or the architecture of the system. The input device 502 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 500 is performed in a device independent space to produce output images of the highest possible quality.

FIG. 5 also shows a processor or processing elements for processing and/or manipulating image data using a plurality of operations and/or processes. The description of the processing elements below is an example of devices capable of implementing processes to be performed and should not be limiting. For example, additional processing elements may be provided along the image path 500. Additionally and/or alternatively, additional operations may be performed on the image data other than or in addition to those described with reference to these figures.

The image path 500 of system 503 may comprise a plurality of image processing elements (or processor) for manipulating image data received from the input device 502 using a plurality of operations and/or processes. The processing elements may be a combination of image processing elements which comprise software and hardware elements that perform a number of operations on the image data received from the input device 502 (e.g., scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 5 comprises a front end processing element(s) 504, a memory 506, storage 508, and a back end processing element(s) 510. Each of the devices or elements in the image path may be communication with each other, as represented by path 507. The front end processing element(s) 504 may comprise any number of processing elements/modules and is/are image processing elements that receive image data in a beginning of an image path and is/are used to process the image data according to user preferences such that it may be stored and later retrieved for output. The back end processing element(s) 510 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 504, 510 and memory 506/storage 508) of system 503 may be connected to a network 522 or telephone system, for example, for communication with other devices, systems, or apparatuses. For example, in some cases, image data or executable instructions may be provided via a computer (CPU) connected to the network 522. As further described below, in a possible embodiment, at least one processing element of system 503 may implement an operative set of processor executable instructions of a billing system. Such a billing system or the executable instructions may be provided via the network 522, for example.

Each of the image processing elements comprises an input and an output. Additionally, the system, device, or apparatus may also include one or more controllers or routers (not shown) to select and route the image data between the processing elements 504 and 510 and memory 506 and/or storage 508, and other elements described below, for example.

Front end processing element(s) 504 receives (e.g., as input) the image data from the input device 502 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 504 may be used to process the scanned image data as well as determine user-defined operations generally known in the art. For example, the front end processing element 504 may be used for color space conversion, reduction or enlargement, document registration, and/or performing other operations or processes on the image data, for example. In some embodiments, the front end processing element 504 converts the image data (e.g., from device dependent to device independent image data, when received via a scanner) for processing and determines neutral and non-neutral pixels. In the herein disclosed method, front end processing element 504 may be used (alone or in cooperation with other elements) to determine a billing structure, such as noted at 116 of the method 100 in FIG. 1 and for image classification.

Memory 506 and/or storage 508 may be used to store image data. For example, memory 506 and/or storage 508 may be used to temporarily store the original image data of document input via input device 502. Converted (e.g., binary to contone image data) or compressed image data may also be stored in the memory 506 and/or storage 508. Memory 506 and/or storage 508 may be used to store machine readable instructions to be executed by the processor/processing elements. The memory 506 and/or storage 508 may be implemented using static or dynamic RAM (random access memory), a floppy disk and disk drive, a writable optical disk and disk drive, a hard disk and disk drive, flash memory, or the like, and may be distributed among separate memory components. The memory 506 and/or storage 508 can also include read only memory, or other removable storage drive(s) or memory devices.

The front end processing element(s) 504 may communicate with memory 506 and/or storage 508 of system/apparatus 500 to store processed and/or compressed image data, for example. Compressed image data may be stored in memory 506 and/or storage 508 temporarily or for a later time when needed. When the image data is needed or it is time for marking (e.g., using the marking engine interface 512 of output device 514), the image data may be retrieved from memory 506 and/or storage 508 via the back end processing element(s) 510 to export the image data that has been scanned, for example.

Back end processing element(s) 510 receives processed image data from the memory 506 or storage 508. Back end processing element (s) 510 may be used to further render the image data for output. For example, back end processing element 510 may be used to convert the color space of the processed image data (e.g., convert from device independent CIE L*a*b color space to device dependent CMYK color space), provide color balance, further rendering, filtering, and/or other operations or processes. Subsequently, back end processing element(s) 510 may be used to decompress the image data and output the image data via the marking engine 512 and output device 514. The output of processed image data from the back end processing element 510 depends on the image path (or output mode). The back end processing element(s) 510 may be used for calculating the amount of CMY color coverage and/or to determine the toner/ink consumption of the output device 514 (e.g., to inform a user that ink needs to be replaced, for example).

In an embodiment, the processed image data may be directly output to the marking engine interface 512 for printing using an output device 514. The marking engine interface 512 may be associated with an output device 514 such as a printer, a copier, or an MFD which is used for printing documents. In some cases, the marking engine interface may be a part of the output device 514, as shown in FIG. 5. In some cases, the marking engine interface may be separate from the output device 514. The marking engine interface 512 is used to output the processing image data to the printer, for example. Specifically, the marking engine interface 512 may be designed to receive the reconstructed and processed image data in device independent space in order to send or output the image data via the output device 514 (e.g., printer) for a copy or print job. The marking engine interface 512 may further perform image processing on the image data to make corrections or compensate for deviation in the printing process. Alternatively, the back end processing element(s) 510 may be used to perform further image processing on the image data.

The marking engine interface 512 outputs processed image data to the output device 514 for outputting the image data of the document. The type of output device 514 should not be limiting. For example, the output device 514 may comprise an image output terminal (IOT), printing device, copying device, or MFD, and may include other devices (e.g., display, screen), as generally noted above. The display or screen may be a part of a computer (CPU) or user interface (UI) or may be provided to relay information from a website or other device via a network 522, for example. In some cases, a UI may be provided directly on the apparatus/device, while in others a UI is provided as a separate electronic device.

It should be noted that the output print quality of image data from an output device 514 such as a MFD may depend on the type of system or device (and its available output modes/resolution). In some cases, multiple print quality modes (PostScript driver), each with a different resolution, are supported. Of course, the algorithms and processes used by the elements in the image path shown in FIG. 5 should not be limiting. Any number of data compression algorithms (e.g., lossless, lossy), decompression algorithms, color conversion algorithms (e.g., contone to binary, or binary to grayscale) and the like may be performed on the image data (in addition to method 100) to provide a high quality output document 516.

In an embodiment, the system or apparatus 503 may further comprise one or more elements for determining a billing structure and/or a billing cost for outputting a page or document via an output device such as device 514. For example, as shown in FIG. 5, an examination element 518 and/or cost calculation element 520 are provided in at least in communication with system 503. In an embodiment, the examination element 518 and/or cost calculation element 520 may be a part of the image path 500 of system 503. In an embodiment, the elements 518 and/or 520 are separate from the image path of the system 503. In an embodiment, the features, calculations, and/or determinations provided by examination element 518 and/or cost calculation element 520 may be incorporated into one or more processing elements, such as elements 504, 510, or 512, and therefore such elements should not be limited to the illustrated embodiment. Also, the features, calculations, and/or determinations should not be restricted to receiving information from front end processing element 504 and back end processing element 510.

Examination element 518 may be configured to examine the image data. The examination element 518 may assist in determining the classification of the image data to be output. For example, the examination element 518 may comprise a classification element 524 that includes counters and/or comparators is configured to perform any of the counting/comparison steps in FIGS. 1 and/or 3 in device independent space. In an embodiment, these counters could be received from front end processing element 504 and/or back end processing element 510.

The examination element 518 may operatively communicate with a cost calculation element 520. The cost calculation element 520 is configured to calculate a billing cost or an approximate cost for outputting the page and/or document of image data using the determined classification. The billing cost may be calculated and based on a determined billing structure. For example, if it is determined that a page is to be billed using a Tier-2 of a multi-tiered billing structure, the cost associated with Tier-2 may be employed. In an embodiment, cost calculation element 520 can receive input from other modules or elements, including input from back end processing element 510, for example (e.g., it may receive pixel counts related to marking each of the CMYK inks).

In an embodiment, the billing cost is further calculated based on a type of output device to be used. For example, when copying using a printer or MFD, the chosen type of output device may alter the cost for printing the page or document due to the plurality of output modes, inks, toners, and other elements which contribute to the quality of the output document 516. In an embodiment, the cost calculation element 520 is configured to operatively communicate with the examination device 518 and at least one of the processing elements (such as 510 or 512) to calculate a billing cost for outputting the page and/or document.

In a possible embodiment, examination element 518 and cost calculation element 520 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 503 may implement the operative set of processor executable instructions of the billing system by communicating via the network 522, for example. The at least one processing element may thus be provided in the same or a remote location with respect to the output device. In some cases, the examination element 518 and/or cost calculation element 520 may communicate an approximate cost or billing cost to the processor/system 503. In some cases, the examination element 518 and/or cost calculation element 520 may be a part of the processor which communicates with system 503 or an output device.

In a possible embodiment, the cost calculated by the cost calculation element 520 (or its associated processing element) may be sent directly to the output device 514. For example, as shown in FIG. 5, the cost calculation element 520 may communicate via path 507 the approximate billing cost to the output device 514. In this case, the cost may be output via a display, screen, or even a print job. By providing the cost in such a manner—i.e., before outputting the image data via a printing or copying output device—the customer can decide if the image data should be marked via interface 512 and output, or if the data should be saved/discarded (e.g., such as if the cost is too high). The customer may choose or select (e.g., see FIG. 1 at 118) to output the image data (e.g., via contact with network 522 or system 503) through the use of an activation button, for example.

Also, it is envisioned that an embodiment in accordance with this disclosure may include a system that utilizes a network connection 522 for proposed billing estimates. For example, a customer may submit a proposed job (e.g., document) to a website such that a cost estimate for outputting (e.g., printing) the job may be provided to the customer via such website. In an embodiment, it is envisioned that the estimate of how much the job will cost may be determined by considering a predetermined type of printing apparatus for output. Depending on the type of device, apparatus, or machine used for output, the cost estimate of the job may differ. Additionally, in an embodiment, it is envisioned that the system and/or website may estimate theoretical costs of the job if the document is printed with alternative type of printing devices or apparatuses, and that such theoretical costs may be presented to the customer (e.g., via the website). These alternative types may include but are not limited to, different brands or types of machines (e.g., company make and model), different output resolutions/capabilities, or different print shops, for example. A system and/or website may utilize a method such as method 100 to estimate such costs, for example. The system may comprise similar elements noted with respect to the image path of the system 500 in FIG. 5, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Such a system is advantageous to a customer as it allows the customer to review theoretical costs before any actual printing or marking occurs. The customer is able to decide, based on a cost estimate, if the job should be output (e.g., printed), without actually outputting the job. Furthermore, the customer may make a decision whether or not to output a job based on types of printing machines. For example, if the system/website includes cost estimates for outputting the job using one or more devices or apparatuses, the customer has the option of choosing a device or apparatus should be used to output the document (or not used), based on the customer's pricing point.

With the herein disclosed methods, existing image paths may be easily altered. For example, neutral pixel and neutral page detection modules may already exist in the image path. As another example, an image path may be missing or have a capability at a different time than indicated. For example, an image path may not have a pixel counting capability prior to job storage. Therefore, a pixel counting module may be placed after job storage (e.g., after both a copy and print job processing) if so desired.

Other embodiments include incorporating the above methods into a set of computer executable instructions readable by a computer and stored on a data carrier or otherwise a computer readable medium, such that the method 100 (in FIG. 1) is automated. In a possible embodiment, the methods may be incorporated into an operative set of processor executable instructions configured for execution by at least one processor. FIGS. 1 and 3 show flow charts of such computer readable instructions that may be implemented by one or more processing elements/processors. For example, in some embodiments, memory or storage of an output device carrying instructions is configured such that when the executable instructions are executed by a computer or processor, they cause a computer or processor to automatically perform a method for determining a billing structure for outputting documents. Such instructions may be contained in memory, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the method 100. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus 500 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate Internet Protocol (IP) address associated with the device. This information may be accessed via a browser. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 503 may be a computer system which includes a bus or other communication mechanism for communicating information, and one or more of its processing elements may be coupled with the bus for processing information. Also, the memory 506 may comprise random access memory (RAM) or other dynamic storage devices and may also be coupled to the bus as storage for the executable instructions. Storage device 508 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data using an image processing apparatus, the image processing apparatus comprising at least one processor for processing documents containing image data comprising a plurality of pixels, the method comprising the following acts implemented by the at least one processor:

receiving image data of a document comprising a plurality of pixels including non-neutral pixels;

determining pixel classifications of the non-neutral pixels in the image data by determining a degree of neutrality of the non-neutral pixels and placing each non-neutral pixel into a corresponding class;

determining a count of the pixels for each class of the determined pixel classifications;

classifying the image data of the document as a whole into a category based on the determination pixel classifications and the determined counts for each pixel classification;

determining a count of CMYK data in device dependent color space for outputting the image data, and determining a billing structure for the image data based on combining the determined count of the CMYK data in device dependent color space along with the category from the classification of image data in the luminance-chroma based color space, wherein the classifying of the image data of the document as a whole into the category is based on luminance-chroma based color space.

2. The method according to claim 1, wherein the pixels of image data are in device independent space for the determining pixel classifications and counts, and wherein the method further comprises:

converting the pixels into a plurality of pixels in device dependent space, and outputting the device dependent image data.

3. The method according to claim 1, wherein the determined billing structure is based on a multi-tiered threshold value.

4. The method according to claim 1, wherein the determining of pixel classifications and counts comprises counting at least a number of true color pixels and fuzzy color pixels in the image data.

5. The method according to claim 4, wherein the determining further comprises comparing at least each count of the true color pixels and of the fuzzy color pixels to one or more predetermined thresholds.

6. The method according to claim 1, wherein the determining of pixel classifications and counts further comprises comparing the non-neutral pixels to one or more predetermined thresholds to classify at least the non-neutral pixels into the corresponding class.

7. The method according to claim 1, wherein the category for classifying the image data of the document as a whole is selected from the group consisting of: neutral, very colorful, fuzzy color, and true color.

8. The method according to claim 1, wherein the classification of the pixels of the image data are determined by applying a neutral pixel determination algorithm to the image data in device independent space.

9. The method according to claim 8, wherein the pixels in device independent space are in L*a*b color space or YCrCb color space.

10. A system for processing image data comprising:

an input device for receiving a document containing image data, the image data comprising a plurality of pixels;

at least one processing element for processing the pixels of the image data in a device independent space, each processing element comprising an input and an output; and an output device for outputting a document, wherein the at least one processing element is configured to: receive image data of the document comprising a plurality of pixels including non-neutral pixels, determine pixel classifications of the non-neutral pixels in the image data by determining a degree of neutrality of the non-neutral pixels and placing each non-neutral pixel into a corresponding class, determine a count of the pixels for each class of the determined pixel classifications, classify the image data as a whole into a category based on the determination of the pixel classifications and the determined counts for each pixel classification, determine a count of CMYK data in device dependent color space for outputting the image data, and determine a billing structure for the image data based on combining the determined count of the CMYK data in device dependent color space along with the category from the classification of image data in the luminance-chroma based color space, wherein the classifying of the image data of the document as a whole into the category is based on luminance-chroma based color space.

11. The system according to claim 10, wherein the pixels of image data are in device independent space, and wherein the at least one processing element is further configured to: convert the pixels into a plurality of pixels in device dependent space, and output the device dependent image data.

12. The system according to claim 10, wherein the determined billing structure is based on a multi-tiered threshold value.

13. The system according to claim 10, further comprising:

a cost calculation element for calculating a billing cost for outputting the page and/or document based on the determined billing structure.

14. The system according to claim 10, wherein the category for classifying the image data of the document as a whole is selected from the group consisting of: neutral, very colorful, fuzzy color, and true color.

15. The system according to claim 10, wherein the classification of the pixels of the image data are determined using a neutral pixel determination algorithm in device independent space.

16. The system according to claim 15, wherein the pixels in device independent space are in L*a*b color space or YCrCb color space.

17. The system according to claim 10, wherein the input device is selected from the group consisting of: an image input terminal, a scanner, a memory device, or a storage device.

18. The system according to claim 10, wherein the output device is selected from the group consisting of: an image output terminal, a display, a printing device, a copying device, a facsimile machine, a network, or a multi-function device.

19. The system according to claim 10, wherein the input device, the at least one processing element, and the output device are provided within an image processing apparatus.

20. A non-transitory computer readable medium having stored computer executable instructions, wherein the computer executable instructions, when executed by a computer, direct a computer to perform a method for processing image data, the method comprising:

receiving image data of a document comprising a plurality of pixels including non-neutral pixels;

determining pixel classifications of the non-neutral pixels in the image data by determining a degree of neutrality of the non-neutral pixels and placing each non-neutral pixel into a corresponding class;

determining a count of the pixels for each class of the determined pixel classifications;

classifying the image data as a whole into a category based on the determination pixel classifications and the determined counts for each pixel classification;

determining a count of CMYK data in device dependent color space for outputting the image data, and determining a billing structure for the image data based on combining the determined count of the CMYK data in device dependent color space along with the category from the classification of image data in the luminance-chroma based color space, wherein the classifying of the image data of the document as a whole into the category is based on luminance-chroma based color space.

21. The medium according to claim 20, wherein the determining of pixel classifications and counts comprises counting at least a number of true color pixels and fuzzy color pixels in the image data.

22. The medium according to claim 21, wherein the determining further comprises comparing at least each count of the true color pixels and of the fuzzy color pixels to one or more predetermined thresholds.

23. The medium according to claim 20, wherein the determining of pixel classifications and counts further comprises comparing the non-neutral pixels to one or more predetermined thresholds to classify at least the non-neutral pixels into the corresponding class.

24. The medium according to claim 20, wherein the category for classifying the image data of the document as a whole is selected from the group consisting of: neutral, very colorful, fuzzy color, and true color.

* * * * *